M. L. SWEENEY.
PIPE OR WELL CASING.
APPLICATION FILED DEC. 28, 1916.
1,240,098.
Patented Sept. 11, 1917.
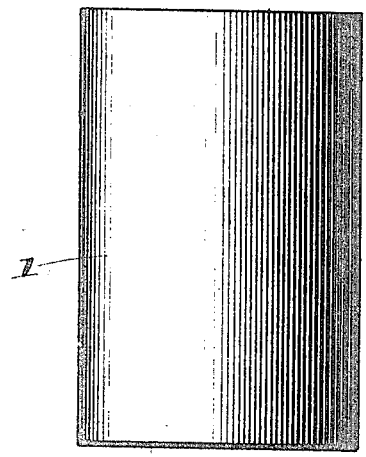
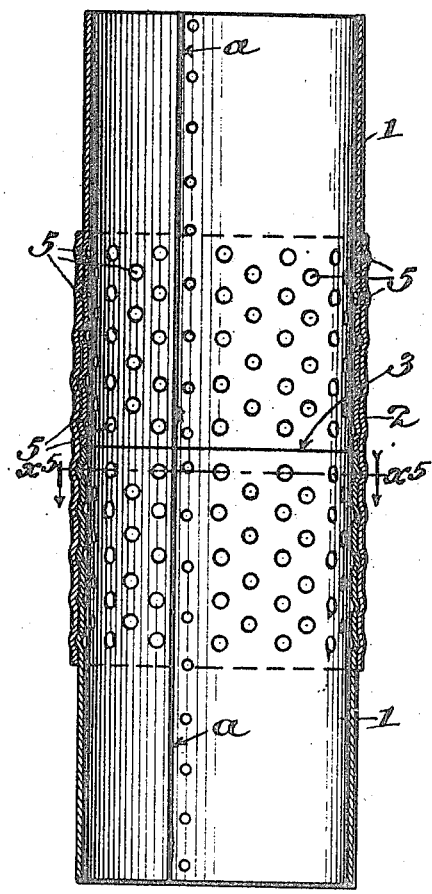
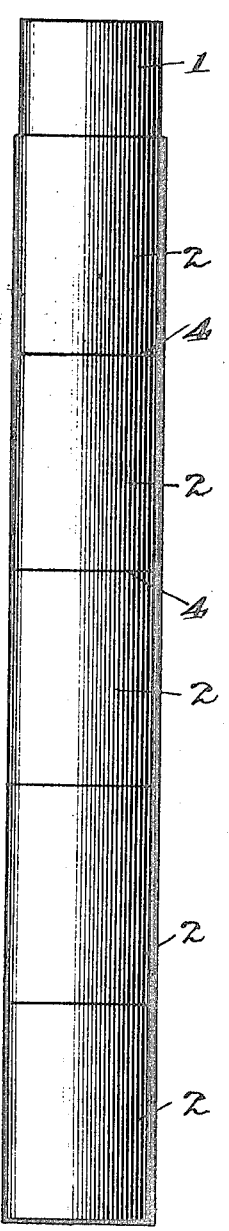
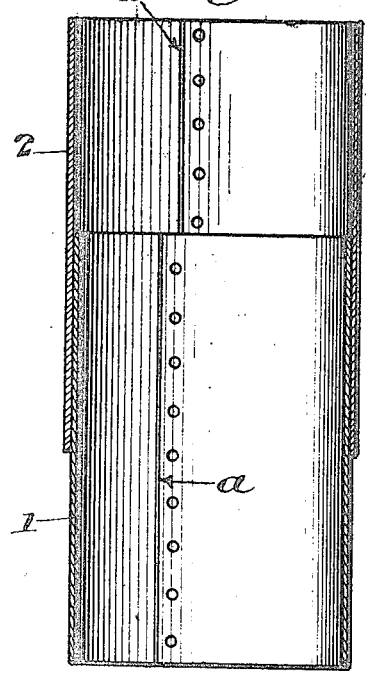
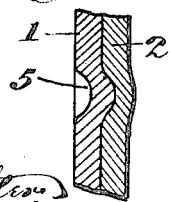
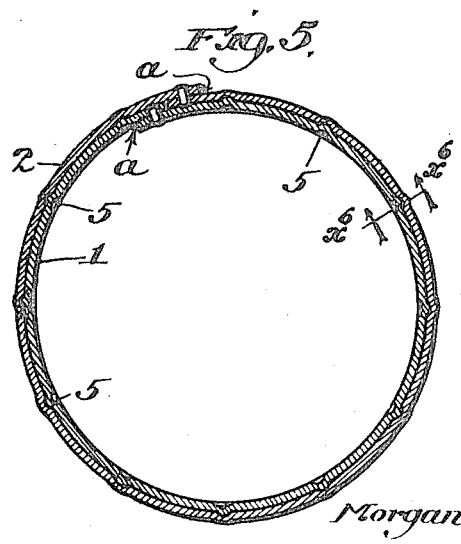
Inventor:
Morgan L. Sweeney.

UNITED STATES PATENT OFFICE.

MORGAN L. SWEENEY, OF LOS ANGELES, CALIFORNIA, ASSIGNOR TO WESTERN PIPE AND STEEL COMPANY OF CALIFORNIA, OF LOS ANGELES, CALIFORNIA, A CORPORATION OF CALIFORNIA.

PIPE OR WELL-CASING.

1,240,098.  Specification of Letters Patent.  Patented Sept. 11, 1917.

Application filed December 28, 1916. Serial No. 139,398.

*To all whom it may concern:*

Be it known that I, MORGAN L. SWEENEY, a citizen of the United States, residing at Los Angeles, in the county of Los Angeles and State of California, have invented a new and useful Pipe or Well-Casing, of which the following is a specification.

This invention relates to pipe, for example, the riveted kind largely employed in the formation of well casing for oil and water wells, said riveted pipe being made up of tubular sections formed of sheet metal.

An object of this invention is to produce pipe of this character which will be comparatively free from projections on the inner surface thereof so as to avoid the formation of obstructions.

In pipe of this character heretofore constructed the longitudinal edges of the plates forming the sections were lapped and riveted together and then the sections were assembled in telescopic relation and the assembled sections were then placed on a riveting machine and perforations made in the overlapped portions, rivets inserted in said perforations from the inside of the pipe and then said rivets were headed over on the outside. The rivets for joining the sections were disposed around the entire circumference of the pipe at the overlapping portions of the sections, and the rivet heads on the inside of the pipe formed a large number of projections at short intervals throughout the length of the casing formed by the joined sections. Said projections produce excessive wear on the cable used in drilling or pumping the well, and an object of this invention is to provide a construction which will eliminate the use of rivets for joining the sections together.

Other objects and advantages will appear in the subjoined detail description.

The accompanying drawings illustrate the invention:

Figure 1 is a side view of a typical tubular section of which the newly invented pipe is constructed.

Fig. 2 is a mid section of two pipe sections like that in Fig. 1 in telescopic relation with one another ready for the fastening operation.

Fig. 3 is a mid section of three assembled pipe sections like that in Fig. 1 showing said sections fastened to one another.

Fig. 4 is a side view of a length of pipe constructed in accordance with this invention, the spot punches not being indicated because of the smallness of the view.

Fig. 5 is an enlarged cross section on line indicated by $x^5$—$x^5$, Fig. 3.

Fig. 6 is an enlarged sectional detail on line indicated by $x^6$—$x^6$, Fig. 5.

It is old and well known in the art of making pipe or well casing to lap the opposite margins of a rectangular plate or sheet of metal and to rivet the overlapping margins together to form a longitudinal seam and sections made in this manner are indicated in the drawings at 1, 2, the seams being indicated at $a$ and the sections 1 being of slightly less diameter than the sections 2 so that the sections 1 will telescope into the sections 2 as clearly shown in Figs. 2 and 3. Adjacent sections 1 have their adjacent ends abutting at 3 and adjacent sections 2 have their adjacent ends abutting at 4 thus forming a pipe of double thickness of sheet metal, the outer and inner sections breaking joint with one another.

In the past it has been customary to place one or more rows of rivets adjacent the joints 3, 4 of the inner and outer sections so as to make said joints tight and prevent the sections from pulling apart. By this invention the use of said rivets is dispensed with and in lieu thereof there is formed by a suitable machine, such, for instance, as a riveting machine or the like equipped with a suitable punching tool a series of outwardly projecting spot punches 5 in the inner sections 1, said punches being formed by indenting the inner surface of the pipe and said punches projecting from the outer surface of the inner sections into the inner surface of the outer sections so that whatever slight projections may be produced by the punches 5 will be on the outer surface of the pipe.

The punches 5 are arranged at intervals circumferentially inside of the pipe and at intervals lengthwise from end to end of the overlapping portions of each two adjacent sections 1, 2.

From the foregoing it is clear that I have produced a pipe and employ a method of making the same whereby when said pipe is used as a casing in a well or for any other purpose where numerous projections around the inner surface thereof would be detrimental, a large number of projections heretofore existing on the inner surface of sheet metal pipe are eliminated. When used as well casing, it is readily understood that, by avoiding the formation of a large number of closely spaced projections around the interior surface of the pipe at each joint thereof, cable extending through the casing for the purpose of drilling or pumping the well will not be frayed and wear out as quickly as if said projections existed. It is understood that to effect the objects of this invention, the punches are preferably formed from the inside of the pipe outward, for if they were made from the outside inward, the raised portions of the punches that would result on the inner surface of the pipe would be detrimental to the life of the cable just the same as rivet heads would be when rivets are employed for fastening the sections together.

It is noted that, because of the hereinbefore described construction, less material may be used in constructing well casing than was heretofore possible because the casing may be made of less diameter owing to the absence of the projections above mentioned. It is understood that by the elimination of the large number of projections, interference with the lowering and pulling of tools is lessened to a great extent.

I claim:

A pipe formed of outer and inner tubular sheet metal sections, the outer sections having their adjacent ends abutting and the inner sections having their adjacent ends abutting and the abutting ends of the outer and inner sections breaking joint, and the outer and inner sections being fastened together by spot punches projecting outward from the outer surface of the inner sections into the inner surface of the outer sections.

Signed at Los Angeles, California, this 19th day of December, 1916.

MORGAN L. SWEENEY.

Witnesses:
GEORGE H. HILES,
A. F. SCHMIDTBAUER.